May 26, 1936.  C. E. UNDERWOOD  2,042,133

GRAIN DRILL ATTACHMENT FOR DISK HARROWS

Filed Aug. 15, 1935

Inventor
Curtis E Underwood.

By L. F. Landreth, Jr.
Attorney

Patented May 26, 1936

2,042,133

UNITED STATES PATENT OFFICE 2,042,133

GRAIN DRILL ATTACHMENT FOR DISK HARROWS

Curtis E. Underwood, Fisher, Ill.

Application August 15, 1935, Serial No. 36,433

1 Claim. (Cl. 111—52)

This invention relates to a novel combination with a disk harrow of a grain drill, and has for its principal object the utilization of the power generated by a revolving disk harrow to operate a seed dropping means or grain drill, and providing means for dropping the seed or grain in the furrows formed by the harrow disks and covering them in one operation.

The more specific objects and advantages will in part be pointed out hereinafter and otherwise become apparent from a consideration of the description following taken in connection with accompanying drawing illustrating an operative embodiment.

In said drawing:—

Figure 1:
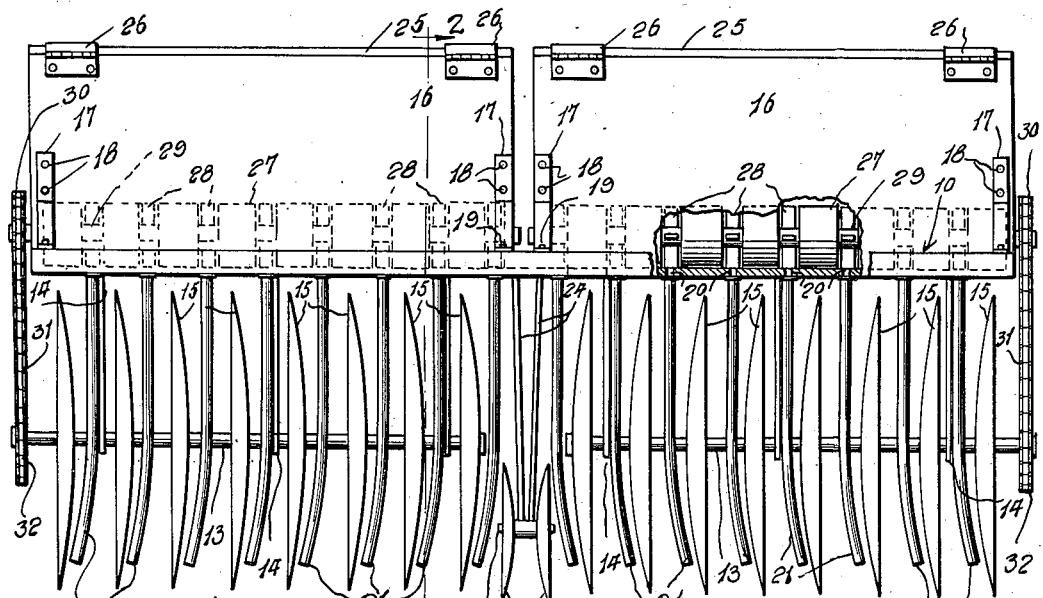
Figure 1 is a rear end elevation of a harrow having the improved grain drill attachment in place thereon.
Figure 3:
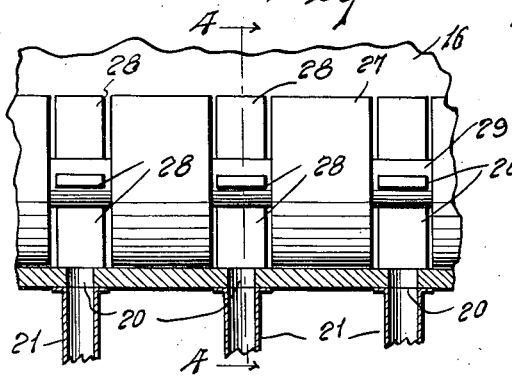
Figure 3 is a view taken substantially on the line 3—3 of Figure 2.
Figure 2:
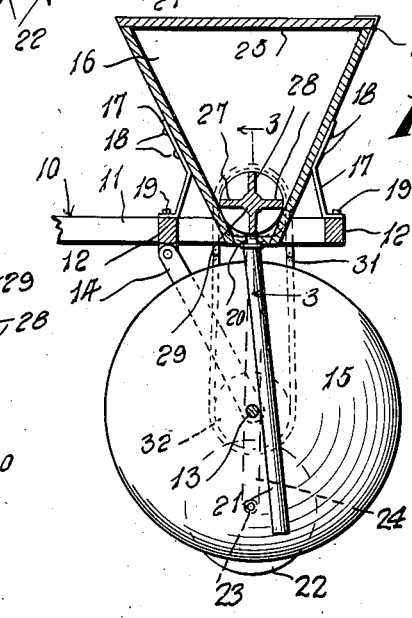
Figure 2 is a longitudinal sectional view taken on the line 2—2 of Figure 1.
Figure 4:
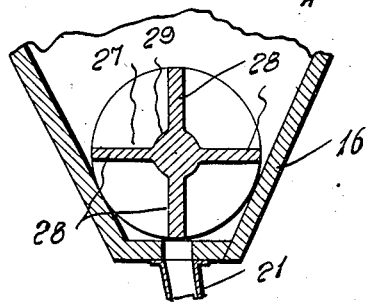
Figure 4 is a detail section taken substantially on the line 4—4 of Figure 3.

Referring specifically to the drawing, 10 generally designates a grain drill which is to be taken as conventional since it may be of any desired make, size or proportion, It has a frame with side bars 11 to which a suitable hitch is made and cross bars at 12. An axle or shaft 13 is journaled in brackets 14, suitably suspended from the frame and along the shaft or shafts 13, a harrow element in the form of disks 15 are strung.

In carrying out the invention, a hopper 16, preferably one for each of the series of harrow disks 15, is removably mounted on the frame 12 as by means of brackets 17 bolted at 18 to the hoppers and at 19 to the frame 12. Each hopper has a series of discharge openings 20 in its bottom wall and depending from each opening is a dropper or deposit tube 21, the lower ends of which are preferably slightly curved as shown to conform to the convex sides of the disks 15, adjacent which they are disposed. As the harrow is drawn along, the disks 15 on the left hand shaft 13 in Figure 1 will throw the dirt to the left while providing furrows, while the disks 15 on the right hand shaft 13 will blow the dirt to the right while providing furrows. At the same time the tubes 21 will drop the seeds from the hoppers before the covering of the furrows. The furrows are not covered by the same disks which provides them but such furrows are covered by the disk next adjacent the disk which provided the furrow. It will thus be seen that were it not for the disks 22, the innermost furrows would not be covered and the seed deposited therein through the adjacent tubes 21 would be wasted.

In order to cover the seed dropped by the two central dropper tubes 21, auxiliary harrow disks 22 of the dished type like those at 15, are secured to a shaft or axle 23, which in turn is journaled in brackets 24, fastened one to each of the hoppers 16 or other parts.

Said hoppers 16 are of conventional form, having covers at 25, hinged in place at 26 and having within the same, distributors 27 provided with any suitable number of blades 28, for instance four as shown, and each distributor having a shaft 29 suitably journaled in the hoppers and exteriorly thereof equipped with sprocket wheels 30 over which a sprocket chain 31 is trained, and which in turn is trained over a sprocket wheel 32 fastened to the shaft 13. Thus as the harrow is drawn along, the shafts 13 will be rotated by the disks whose motion will be imparted to the shafts 29 and distributors through the medium of the sprockets 30 and 32 and chain 31.

Various changes may be resorted to provided they fall within the spirit and scope of the invention.

What is claimed is:—

In combination with a harrowing implement having a frame, axles thereon and disks on said axles, hoppers on said frame, each hopper having seed discharge openings, distributors within the hoppers associated with said openings, shafts for said distributors having sprocket wheels thereon, sprocket wheels on the first mentioned shafts, sprocket chains trained over the sprocket wheels, dropper tubes depending from the openings of said hoppers at the convex sides of the disks, auxiliary disks each having its concaved side facing the innermost dropper tubes so as to function to cover the seed dropped by such innermost tubes, and means depending from the frame mounting said auxiliary disks between said innermost dropper tubes.

CURTIS E. UNDERWOOD.